(12) United States Patent
Li

(10) Patent No.: US 11,748,255 B1
(45) Date of Patent: Sep. 5, 2023

(54) METHOD FOR SEARCHING FREE BLOCKS IN BITMAP DATA, AND RELATED COMPONENTS

(71) Applicant: INSPUR SUZHOU INTELLIGENT TECHNOLOGY CO., LTD., Jiangsu (CN)

(72) Inventor: Yanhong Li, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/011,510

(22) PCT Filed: Jun. 30, 2021

(86) PCT No.: PCT/CN2021/103380
§ 371 (c)(1),
(2) Date: Dec. 19, 2022

(87) PCT Pub. No.: WO2022/042011
PCT Pub. Date: Mar. 3, 2022

(30) Foreign Application Priority Data

Aug. 28, 2020 (CN) .......................... 202010889329.3

(51) Int. Cl.
*G06F 12/02* (2006.01)
*G06F 16/22* (2019.01)

(52) U.S. Cl.
CPC ...... *G06F 12/0238* (2013.01); *G06F 16/2228* (2019.01)

(58) Field of Classification Search
None
See application file for complete search history.

(56) References Cited

U.S. PATENT DOCUMENTS

| | | | | |
|---|---|---|---|---|
| 8,200,926 B1* | 6/2012 | Stringham | .......... | G06F 11/1448 |
| | | | | 711/162 |
| 8,539,179 B1* | 9/2013 | Stringham | .......... | G06F 11/1448 |
| | | | | 711/E12.103 |
| 10,303,671 B1* | 5/2019 | Addepalli | .......... | G06F 16/2246 |
| 11,640,339 B2* | 5/2023 | Reed | .................... | G06F 11/1469 |
| | | | | 711/162 |
| 2016/0334997 A1* | 11/2016 | Wang | .................... | G06F 3/0605 |

FOREIGN PATENT DOCUMENTS

| | | |
|---|---|---|
| CN | 104731872 A | 6/2015 |
| CN | 107665146 A | 2/2018 |
| CN | 109992527 A | 7/2019 |
| CN | 110688065 A | 1/2020 |
| CN | 110780820 A | 2/2020 |
| CN | 111984652 A | 11/2020 |
| WO | 2018063020 A1 | 4/2018 |

OTHER PUBLICATIONS

PCT/CN2021/103380 international search report.

* cited by examiner

*Primary Examiner* — Charles Rones
*Assistant Examiner* — Ryan Dare
(74) *Attorney, Agent, or Firm* — IPRO, PLLC

(57) ABSTRACT

A method for searching for free blocks in bitmap data. For searching for free blocks in the bitmap data, distribution information of free blocks can be directly obtained by performing array value solving operation, with the value of the integer data obtained by dividing the bitmap data into blocks being used as an index, on a template array. Also provided are an apparatus for searching for free blocks in the bitmap data, a device, and a readable storage medium.

20 Claims, 2 Drawing Sheets

US 11,748,255 B1

METHOD FOR SEARCHING FREE BLOCKS IN BITMAP DATA, AND RELATED COMPONENTS

The present disclosure claims the benefit of priority to Chinese patent application No. 202010889329.3, filed on Aug. 28, 2020 before the CNIPA, China National Intellectual Property Administration, and entitled "METHOD FOR SEARCHING FOR FREE BLOCKS IN BITMAP DATA AND RELATED COMPONENTS", the disclosure of which is incorporated herein by reference in its entirety.

TECHNICAL FIELD

The present application relates to the technical field of storage systems, in particular to a method, apparatus, device for searching for free blocks in bitmap data, and a readable storage medium.

BACKGROUND

With the widespread use of solid state disks (SSDs), some schemes for adapting storage systems to SSDs have been developed for better performance. Such schemes include bitmap management. Existing research institutions and storage manufacturers are committed to study how to adapt to SSDs and propose adaptation schemes. In the management of bitmap data, it is necessary to count the number of free blocks (bit (binary digit) of 0) in bitmap data blocks, to realize functions of allocation and recovery of storage space, storage and migration of data according to this information.

Currently, the number of 0(s) in the bitmap data block is counted via bit-by-bit traversal. Since there will be an average of 262,144 bits in a bitmap data block, 262144 cycles need to be carried out for determining a distribution of free blocks in the bitmap data block, that is, the processing efficiency is relatively low. Furthermore, at present, the space granularity used for adapting to SSDs is greatly reduced and state change is faster, thus the data volume of the bitmap data is very large accordingly, and value change is particularly fast. Therefore, if such bit traversal mode is adopted for each bitmap data block to determine the free blocks in the bitmap data block, not only the implementation efficiency of searching for free blocks is very low, the efficiency of space recovery will be further affected, thereby affecting an efficient management of the overall storage space.

In view of the above, how to improve the efficiency of searching for free blocks in bitmap data is an urgent problem to be solved by a those skilled in the art

SUMMARY

An object of the present application is to provide a method for searching for free blocks in bitmap data, that can significantly improve the implementation efficiency of searching for free blocks in the bitmap data to provide reliable support for further space recovery and data management. Another object of the present application is to provide a device, apparatus for searching for free blocks in bitmap data, and a readable storage medium.

In order to solve the above-mentioned technical problem, the present application provides a method for searching for free blocks in bitmap data, including:
determining a bitmap data block that is to be searched for free blocks;
dividing the bitmap data block into a plurality of integer data with a fixed length;
obtaining data arrangement characteristic information corresponding to integer data by performing, with a value of the integer data being used as an index, an array value solving operation on a template array; where values of all integer data with the fixed length are used as array indexes of the template array, and corresponding data arrangement characteristic information is used as data items of the template array; the data arrangement characteristic information comprises distribution information and a number of free blocks; and
obtaining a statistic of an overall distribution of free blocks in the bitmap data block according to data arrangement characteristic information corresponding to each of the integer data Optionally, the data arrangement characteristic information includes a data level and the number of free blocks, the data level indicates a data block release priority generated according to the distribution of free blocks, and is used as the distribution information;

accordingly, after obtaining the statistic of the overall distribution of free blocks in the bitmap data block according to data arrangement characteristic information corresponding to each of the integer data, the method further includes: releasing the bitmap data block according to the overall distribution of free blocks.

Optionally, dividing the bitmap data block into a plurality of integer data with a fixed length includes: dividing the bitmap data block every 16 bits to obtain a plurality of 16-bit integer data.

Optionally, the data level and a corresponding determination rule include:
Level 1, more than 15 bits being 0;
Level 2, 8 or more successive bits being 0, and the successive bits of 0 being located on both sides;
Level 3, 8 or more successive bits being 0, and the successive bits of 0 being located in the middle;
Level 4, 4~7 successive bits being 0, and the successive bits of 0 being located on both sides;
Level 5, 4~7 successive bits being 0, and the successive bits of 0 being located in the middle;
Level 6, less than 4 successive bits being 0, and a total number of bits of 0 being not less than 10;
Level 7, less than 4 successive bits being 0, and the total number of bits of 0 being not less than 6;
Level 8, no successive bits being 0, and the total number of bits of 0 being not less than 6;
Level 9, no successive bits being 0, and the total number of bits of 0 being less than 6;
Level 10, 16 bits all being 1;
where 0 is a free block, 1 is a non-free block, and a data block release priority decreases from Level 1 to Level 10.

Optionally, releasing the bitmap data block according to the overall distribution of free blocks includes:
for integer data belonging to Level 1, Level 2 and Level 3, selecting more than 8 successive bits of 0 for bit release;
for integer data belonging to Level 4 and Level 5, selecting more than 4 successive bits of 0 for bit release; and
for integer data belonging to Level 6, Level 7, Level 8, Level 9 and Level 10, searching for bits of 0 for bit release.

Optionally, after dividing the bitmap data block into a plurality of integer data with a fixed length, the method further includes:

selecting a designated number of data as sample data by sampling the integer data randomly;

accordingly, the obtaining data arrangement characteristic information corresponding to integer data by performing, with a value of the integer data being used as an index, an array value solving operation on a template array comprises: obtaining data arrangement characteristic information corresponding to the sample data by performing, with the value of the sample data being used as the index, an array value solving operation on the template array;

accordingly, the obtaining a statistic of an overall distribution of free blocks in the bitmap data block according to data arrangement characteristic information corresponding to each of the integer data includes: obtaining the statistic of the overall distribution of free blocks in the bitmap data block according to data arrangement characteristic information corresponding to each of the sample data.

Optionally, obtaining a statistic of the data arrangement characteristic information under all target integer data includes:

performing a weighted calculation, with a data block release priority corresponding to the data level being used as a weight, on the number of sample data corresponding to each data level, and using the obtained weighted value as the overall distribution of free blocks in the bitmap data block;

accordingly, after obtaining statistics of the overall distribution of free blocks in the bitmap data block according to the data arrangement characteristic information corresponding to each integer data, the method further includes:

calculating a ratio of a weighted value corresponding to each bitmap data block to the total number of free blocks in the bitmap data block;

releasing each bitmap data block in a descending order of the ratio.

The present application further provides an apparatus for searching for free blocks in bitmap data, including:

a bitmap determination unit, configured to determine a bitmap data block that is to be searched for free blocks;

a data division unit, configured to divide the bitmap data block into a plurality of integer data with a fixed length;

a template matching unit, configured to obtain data arrangement characteristic information corresponding to the integer data by performing an array value solving operation, with a value of the integer data being used as an index; wherein values of all integer data with the fixed length are used as array indexes of the template array, and corresponding data arrangement characteristic information is used as data items of the template array; the data arrangement characteristic information comprises distribution information and a number of free blocks; and a statistical unit, configured to obtain a statistic of an overall distribution of free blocks in the bitmap data block according to data arrangement characteristic information corresponding to each of the integer data.

The present application further provides a computer device including:

a memory for storing a computer program; and a processor for executing the computer program to implement the steps of the method for searching free blocks in bitmap data.

The present application further provides a readable storage medium having stored thereon a program that, when executed by a processor, implements the steps of the method for searching for free blocks in the bitmap data.

According to the method for searching for free blocks in bitmap data provided by the present application, free blocks in a bitmap data are searched. In the method, distribution information of free blocks can be directly obtained by performing array value solving operation, with the value of the integer data obtained by dividing the bitmap data into blocks being used as an index, on a template array, avoiding the tremendous power consumption caused by the one-to-one comparison of bit in bitmap data, and greatly improving the processing efficiency.

The present application further provides an apparatus, a device for searching for free blocks in bitmap data, and a readable storage medium, which have the above-mentioned advantages and are not described in detail herein.

BRIEF DESCRIPTION OF THE DRAWINGS

The accompanying drawings as used in the description of embodiments of the present disclosure or related art will be briefly introduced below so as to clearly illustrate solutions of the embodiments or related art. It is apparent that the accompanying drawings in the following description illustrate merely some embodiments of the present disclosure, and those skilled in the art may obtain other accompanying drawings based on these accompanying drawings without paying any creative efforts. In the figures.

DETAILED DESCRIPTION OF THE EMBODIMENTS

A core of the present application is to provide a method for searching for free blocks in bitmap data, that can significantly improve the implementation efficiency of searching for free blocks in the bitmap data to provide reliable support for further space recovery and data management. Another core of the present application to provide a device, apparatus for searching for free blocks in bitmap data, and a readable storage medium.

In order to make objects, solutions and advantages of embodiments of the present application more clear, a clear and complete description of solutions of embodiments of the present application is provided below in conjunction with the accompanying drawings of specific embodiments. Apparently, only a part of the embodiments, not all the embodiments of the present application, are described. All other embodiments obtained, based on the embodiments described in the present disclosure, by those skilled in the art without paying creative efforts shall fall within the protection scope of the present application.

Figure 1:
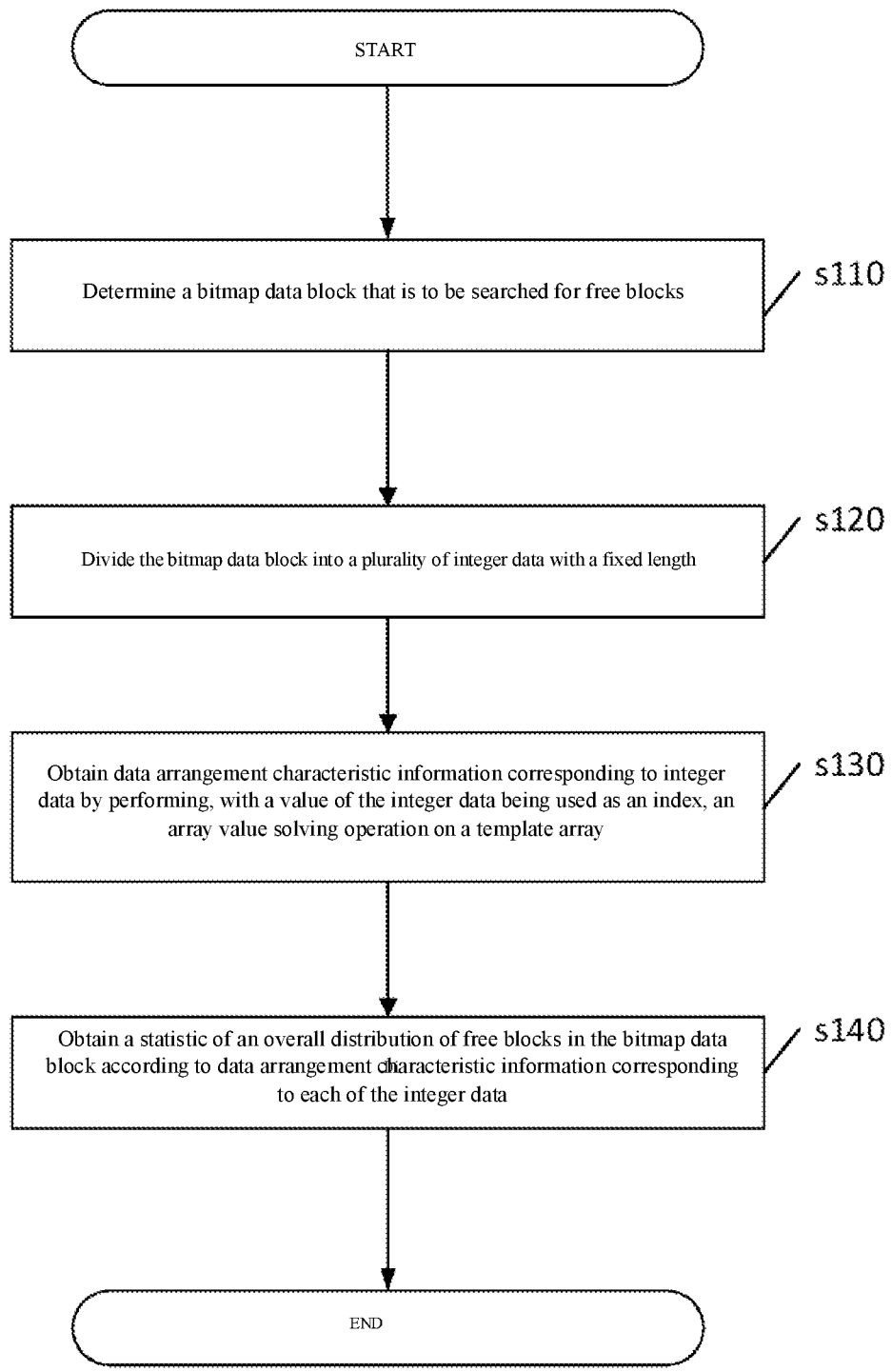
FIG. 1 is a flow chart illustrating a method for searching for free blocks in bitmap data according to an embodiment of the present disclosure.

The present application provides a method for searching for free blocks in bitmap data. With reference to FIG. 1, which is a flow chart illustrating a method for searching for free blocks in bitmap data provided in the embodiment, the method mainly includes steps s110 to s140.

In step s110, a bitmap data block that is to be searched for free blocks is determined.

A Bitmap management method in a storage system adapted to the SSD includes two types of bitmap, i.e., a data volume bitmap and a metadata volume bitmap, where the data volume bitmap is used for marking the state of blocks in data LSA volume, and the metadata volume bitmap is used for marking the state of each grain in metadata LSA volume. The values of the two types of Bitmap respectively represent different meanings, and the management methods have similarities and have differences. The bitmap data block in this step can be either a data volume bitmap block or a metadata volume bitmap block, both of which are applicable to the two types of Bitmap. The type of a specific bitmap data block in this step is not limited.

A free block refers to a data block a bit of which is 0. A bitmap data block contains about 262144 binary bits, such as 0100011101010 . . . 01010, and the data length is about 262,144. The data block contains irregularly distributed 0 and 1. In order to facilitate the subsequent management process of bitmap data, such as the allocation and recovery of storage space, and the storage and migration functions of data, it is necessary to count the number of free blocks in the bitmap data block, and the bitmap data block, that is to be searched for free blocks currently, is taken as a target bitmap data block, to search for the free blocks.

In step s120, the bitmap data block is divided into a plurality of integer data with a fixed length.

The bitmap data block is divided at a fixed length into data segments to obtain a plurality of integer data with the fixed length. In the embodiment, a division spacing for the data segments, i.e. the size of the fixed length, is not limited, and can be 8 bits, 16 bits, etc. and the division can be performed according to actual data comparison requirements. In subsequent steps, it is necessary to determine data arrangement characteristic information corresponding to all possible forms of integer data according to the length of the integer data to generate a template array. Therefore, in order to control the size of the template array and control searching times of free blocks in the bitmap data block as far as possible, optionally, the bitmap data block can be divided every 16 bits to obtain a plurality of 16-bit integer data. The bitmap data block with 262144 bits divided by 16 bits can be regarded as 16384 uint16 values, and all the possible forms of integer data include 6656 forms. Assuming that the data arrangement characteristic information for each form includes 8 bits, the template array needs to occupy 65536 Byte=64 KB, the space occupation is smaller and the number of data comparison is less. In the embodiment, only the case where the integer data has the value of uint16 is described, and the free block search process in the case that the integer data has other data lengths can be described with reference to the embodiment, which will not be described in detail herein.

In step s130, an array value solving operation is performed, with the value of the integer data being used as an index, on a template array to obtain data arrangement characteristic information corresponding to the integer data.

Values of all integer data with the fixed length are used as indexes of the template array, and corresponding data arrangement characteristic information is used as data items of the template array. Taking a fixed length of 3 as an example, binary integer data with a length of 3 includes 8 types of data forms of 000, 001, 010, 011, 100, 101, 110 and 111, and the values of corresponding integer data (converted to decimal values) are 0, 1, 2, 3, 4, 5, 6 and 7, respectively.

The data arrangement characteristic information includes distribution information and the number of free blocks, for example, there are two 0 in total, and the discontinuities are respectively located at two sides; the data arrangement characteristic information obtained after conversion is an 8-bit integer, for example, 0101, 0010; and according to a pre-set data arrangement characteristic information generation method, the data arrangement characteristic information corresponding to each the binary integer data can be obtained respectively as follows: the data arrangement characteristic information corresponding to 000 is 0001 0000, the data arrangement characteristic information corresponding to 001 is 0010 0001, the data arrangement characteristic information corresponding to 010 is 0011 0010, etc.

Various data arrangement characteristic information is arranged in the template array with the values of all integer data with the fixed length as array indexes. For example, the value of 000 is 0, then the data arrangement characteristic information corresponding to 000 is arranged as the 0th item of the template array; the value of 010 is 2, then the data arrangement characteristic information corresponding to 010 is arranged as the 2nd item of the template array. If the integer data, for which free block information is currently to be determined, is 000 and has a value of 0, then an array item with an index of 0 is taken, and the template array outputs the 0th item (data arrangement characteristic information corresponding to 000) to be taken out so as to obtain the data arrangement characteristic information about the integer data for which the free block information is currently to be determined. The free block distribution information of the current integer data can be obtained by merely one array value operation, without traversing all bits in the current integer data one by one (16-bit integer data needs to be compared for 16 times), which greatly improves the processing efficiency.

In step s140, statistics of an overall distribution of free blocks in the bitmap data block is obtained according to data arrangement characteristic information corresponding to each of the integer data.

In order to simplify the problem that a template for a bitmap data block with a long length is too large due to a direct template matching process, in the embodiment, the bitmap data block is divided into a plurality of small blocks, then a template matching processing is respectively performed on each of the small blocks, and the distribution of free blocks in the whole bitmap data block needs to be determined finally. Therefore, the statistics of the template matching result of each small block needs to be conducted, and the distribution of free blocks in the whole bitmap data block is further generated.

However, a specific statistical implementation algorithm and steps therein are not limited in the embodiment, and an adjacent block can be determined according to the cutting position of each small block to determine the distribution of free blocks in the whole bitmap data block. In the embodiment, this implementation method is merely used for the purpose of description, and other implementation methods can all be referred to the description of the embodiment, which will not be described in detail herein.

Based on the above introduction, in the method for searching for free blocks in the bitmap data provided in the embodiment, as for searching for free blocks in the bitmap data, the distribution information of the free blocks can be directly obtained by performing, with the value of the integer data obtained from dividing the bitmap data into blocks being used as an index, the array value solving operation on the template array, thereby avoiding the tremendous power consumption caused by the one-to-one comparison of bits in the bitmap data, and greatly improving the processing efficiency.

In the above-mentioned embodiments, a specific data form of the data arrangement characteristic information and the information contained therein are not limited. Optionally, in order to facilitate a subsequent recovery processing of the free blocks, the data arrangement characteristic information may specifically include a data level and the number of free blocks. The data level indicates a data block release priority generated according to the distribution of free blocks, and is used as distribution information. Accordingly, after the statistics of the overall distribution of free blocks in the bitmap data block is obtained according to the data arrangement characteristic information corresponding to each integer data, the bitmap data block may be further released according to the overall distribution of the free blocks.

For example, the bitmap data block is divided at a spacing of 16 bits to obtain a plurality of 16-bit integer data, then the data arrangement characteristic information can be 8-bit integer data, the first 4 bits of which indicate the data level, and the last 4 bits indicate the number of 0(s) in the 16-bit integer data. For example, if the 16-bit integer data is {1111100000000000}, the data level is 2, and the number of 0(s) in uint16 is 11, then the data arrangement characteristic information can be 0010 1011. For another example, if the 16-bit integer data is {1111111111000000}, the data level is 4, and the number of 0(s) in the uint16 is 6, then the data arrangement characteristic information can be 0100 0110. In the embodiment, the feasible form of the data length and the characteristic information under the information type is mainly used as an example for description; and the setting of other data lengths and the characteristic information under the information type can be described with reference to the description of the embodiment, which will not be described again. Then, herein, the data template is composed of a uint8 array with a length of 65536, and the index of the array is a value of the uint16 under all data arrangements, and the structure is: const uint8 templet[65536]={x, x, x, . . . , x}; where x is a uint8 array. The template array needs to occupy 65536 Byte, i.e., 64 KB, thus the space occupation is small. When using template matching method to process 100 integer data, the data distribution level in the sample and the total number of 0(s) in the sample can be obtained merely by performing the array value solving operation for 100 times, which greatly improves the processing efficiency.

The data level indicates the data block release priority generated according to the distribution of free blocks, and the classification rule of the data level is not limited in the embodiment. Optionally, a classification rule for 10 data levels is as follows:

Level 1, more than 15 bits being 0;
Level 2, 8 or more successive bits being 0, and the successive bits of 0 being located on sides (indicating that these bits possibly constitute successive 0(s) together with adjacent unit 16);
Level 3, 8 or more successive bits being 0, and the successive bits of 0 being located in the middle;
Level 4, 4-7 successive bits being 0, and the successive bits of 0 being located on sides;
Level 5, 4-7 successive bits being 0, and the successive bits of 0 being located in the middle;
Level 6, less than 4 successive bits being 0, and the total number of bits of 0 being not less than 10;
Level 7, less than 4 successive bits being 0, and the total number of bits of 0 being not less than 6;
Level 8, no successive 0(s), and the total number of bits of 0 being not less than 6;
Level 9, no successive 0(s), and the total number of bits of 0 being less than 6;
Level 10, 16 bits being all 1;
where 0 is a free block, 1 is a non-free block, and the data block release priority decreases from Level 1 to Level 10.

The above-mentioned level classification fully takes into account the influence of various distributions of free blocks on the spatial recovery processing. The levels are classified according to the data arrangement characteristics in the unit 16, and the number of levels is suitable, avoiding the problem of oversimplification or overcomplexity caused by too few or too many levels for a subsequent recovery process.

Under the above-mentioned level rule, a specific process of releasing a bitmap data block according to the overall distribution of free blocks is not limited, and optionally, may specifically include the following steps:

as for integer data belonging to Levels 1, 2 and 3, selecting more than 8 successive bits being 0 for bit release;
as for integer data belonging to Levels 4 and 5, selecting more than 4 successive bits being 0 for bit release; and
as for integer data belonging to Levels 6, 7, 8, 9 and 10, searching for the bit being 0 for bit release.

In the embodiment, the above-mentioned level classification form is merely taken as an example for description, and other level classification forms and free block search modes under the rule can all be referred to the description of the embodiment, the description thereof will not be repeated here.

In the above embodiments, characteristic information matching of the template array can be performed on each integer data obtained by dividing the bitmap data block. Taking 16-bit division as an example, 262144 bits are taken as 16384 unit 16 values, jt will take a long time for matching 16384 unit 16 values one by one. In order to further improve the search efficiency of free blocks, optionally, several (such as 100) unit 16 may be randomly selected and used as samples, and the distribution of 0 in the bitmap data block is estimated by analyzing the distribution of 0 in the samples, thereby reducing the workload of template matching and improving the search efficiency.

Specifically, after the bitmap data block is divided into a plurality of integer data with a fixed length, the plurality of integer data is randomly sampled to select a specified number of data as sample data. Accordingly, the step, that the array value solving operation is performed, with the value of the integer data being used as an index, on the template array to obtain data arrangement characteristic information corresponding to the integer data, includes: performing array value solving operation on the template array, with the value of the sample data being used as the index, to obtain data arrangement characteristic information corresponding to the sample data. Accordingly, the step, that statistics of an overall distribution of free blocks in the bitmap data block is obtained according to data arrangement characteristic information corresponding to each of the integer data, includes: obtaining statistics of the overall distribution free blocks in the bitmap data block according to the data arrangement characteristic information corresponding to each sample data.

In the above embodiments, a processing mode after obtaining the overall distribution of free blocks in the bitmap data block is not limited. However, a data block release processing may be further performed based on the overall distribution of free blocks.

Specifically, when obtaining statistics of data arrangement characteristic information under all the target integer data, a weighted calculation is performed, with a data block release priority degree corresponding to the data level be used as a weight, on the number of sample data corresponding to each data level, and the obtained weighted value is taken as the overall distribution of free blocks in the bitmap data block. Accordingly, after obtaining statistics of the overall distribution of free blocks in the bitmap data block according to the data arrangement characteristic information corresponding to each integer data, the method further includes:

(1) calculating a ratio of a weighted value corresponding to each bitmap data block to the total number of free blocks in the bitmap data blocks;

(2) releasing each bitmap data block in a descending order of the ratio.

To enhance understanding, a specific implementation scenario is described below.

A template array with the length of 65536 composed of uint8 arrays is provided, the index of the array is taken as the value of uint16 of a sample, and the structure is: const uint8 templet[65536]={x, x, x, . . . , x}; In the value of corresponding uint8, the first 4 bits indicate the data level and the last 4 bits indicate the number of 0(s) in uint16.

The bitmap data block of 262144 bits is regarded as 16384 uint16 values, 10 uint16 are randomly sampled as samples, and template array matching is performed on the samples to obtain data arrangement characteristic information templet corresponding to each sample.

Sample 1: {1111100000000000}, data level: 2, number of 0(s) in uint16: 11. templet[0]=0010 1011.
Sample 2: {1111111111000000}, data level: 4, number of 0 in uint16: 6. templet[1]=0100 0110
Sample 3: {1110000000000111}, data level: 3, number of 0 in uint16: 10 templet[2]=0011 1010
Sample 4: {1111100000011111}, data level: 5, number of 0(s) in uint16: 6 templet[3]=0101 1010
Sample 5: {0000000000000001}, data level: 1, number of 0(s) in uint16: 15 templet[4]=0001 1111
Sample 6: {1010101001001000}, data level: 6, number of 0(s) in uint16: 10 templet[5]=0110 1010
Sample 7: {1010101010101011}, data level: 7, number of 0(s) in uint16: 7 templet[6]=0111 0111
Sample 8: {1010101011111111}, data level: 9, number of 0(s) in uint16: 4 templet[7]=1001 0100
Sample 9: {1010101010101011}, data level: 8, number of 0(s) in uint16: 7 templet[8]=1000 0111
Sample 10: {1111111111111111}, data level: 10, number of 0(s) in uint16: 0 templet[9]=1010 0000

A weight is set for each level, such as:
Level 1: 10
Level 2: 9
Level 3: 8
Level 4: 7
Level 5: 6
Level 6: 5
Level 7: 4
Level 8: 3
Level 9: 2
Level 10: 1

Assuming there are 10 blocks, each having 10 samples of the same level and 0(s), corresponding to the above samples 1-10, respectively.

Weighted value of each block is obtained through weight calculation:

Block[0]=9*10=90; ratio of weighted value to 0: 90/11=8.18
Block[1]=7*10=70; ratio of weighted value to 0: 70/6=11.67
Block[2]=8*10=80; ratio of weighted value to 0: 80/10=8
Block[3]=6*10=60; ratio of weighted value to 0: 60/6=6
Block[4]=10*10=100; ratio of weighted value to 0: 100/15=6.67
Block[5]=5*10=50; ratio of weighted value to 0: 50/10=5
Block[6]=4*10=40; ratio of weighted value to 0: 40/7=5.71
Block[7]=2*10=20; ratio of weighted value to 0: 20/4=5
Block[8]=3*10=30; ratio of weighted value to 0: 30/7=4.29
Block[9]=1*10=10; ratio of weighted value to 0: 10/0=∞ (discarded)

Ratios of weighted values to the number of 0(s) in the block are ranked as follows:

Block[1]>Block[0]>Block[2]>Block[4]>Block[3]>Block[6]>Block[5]=Block[7]>Block[8].

Therefore, when selecting blocks, blocks are selected one by one in the above order.

When selecting bits to be released, only more than eight successive bits that are free are selected if the level is 1, 2 or 3; only four successive bits that are free are selected if the level is 4 or 5; and free bits are searched and selected if the level is other remaining levels.

When the data volume bitmap is modified, the minimum modification unit bit, i.e., the allocation and recovery of the block correspond to the modification of bit in the bitmap. The allocation of the block corresponds to modifying a bit from 0 to 1, and the recovery of block corresponds to modifying a bit from 1 to 0.

Figure 2:
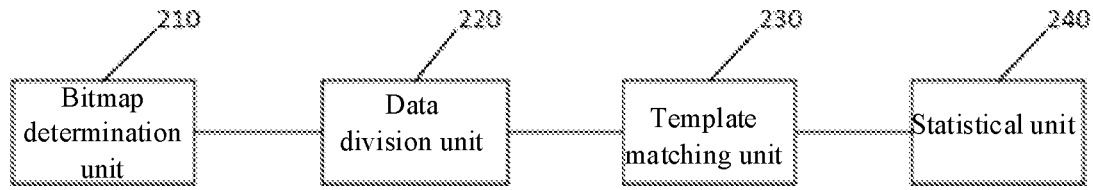
FIG. 2 is a structural block diagram illustrating an apparatus for searching for free blocks in bitmap data according to an embodiment of the present disclosure.

FIG. 2 is a structural block diagram illustrating an apparatus for searching for free blocks in bitmap data provided in an embodiment. With reference to FIG. 2, the device mainly includes a bitmap determination unit 210, a data division unit 220, a template matching unit 230, and a statistics unit 240. The device for searching for free blocks in bitmap data provided in the present embodiment can refer to the above-mentioned method for searching the free blocks in bitmap data.

The bitmap determination unit 210 is configured to determine a bitmap data block that is to be searched for free blocks.

The data division unit 220 is configured to divide the bitmap data block into a plurality of integer data with a fixed length.

The template matching unit 230 is configured to obtain data arrangement characteristic information corresponding to the integer data by performing an array value solving operation on a template array with the value of the integer data being used as an index. The values of all integer data with the fixed length are used as indexes of the template array, and corresponding data arrangement characteristic information is used as the data item of the template array. The data arrangement characteristic information includes distribution information and the number of free blocks.

The statistical unit 240 is configured to obtain a statistic of an overall distribution of free blocks in the bitmap data block according to the data arrangement characteristic information corresponding to each of the integer data.

An embodiment provides a computer device, mainly including a memory and a processor. The memory is configured to store programs. The processor is configured to, when executing the programs, implement steps of the method for searching for free blocks in the bitmap data as described in the above embodiments, please refer to the above description of the method for searching for free blocks in the bitmap data for details.

Figure 3:
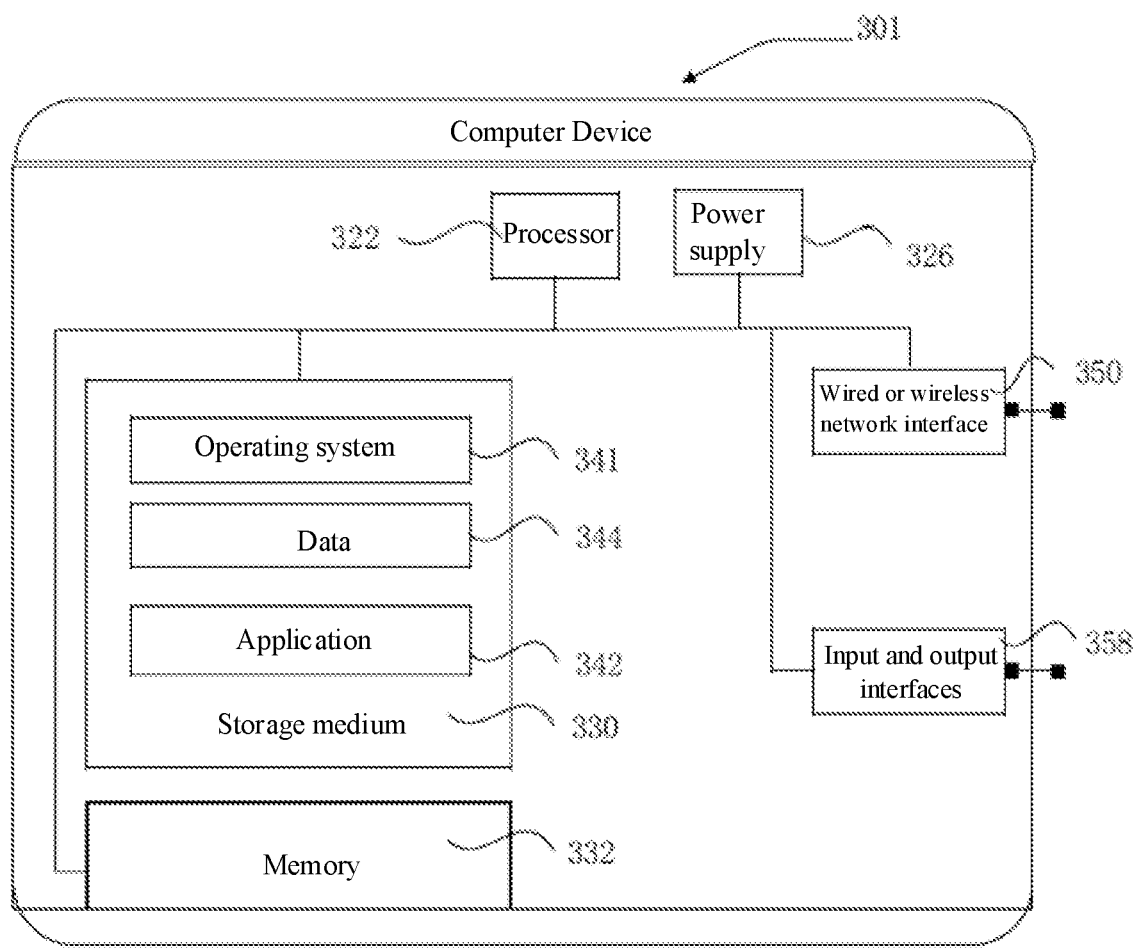
FIG. 3 is a schematic structural diagram illustrating a computer device according to an embodiment of the present disclosure.

FIG. 3 is a schematic structural diagram illustrating a computer device provided by the embodiment. The computer device may vary widely in configuration or performance, and may include one or more processors (central processing units) 322 and a memory 332, one or more storage media 330 (e.g. one or more mass computer devices) that store applications 342 or data 344. The memory 332 and storage mediums 330 may be transient storage or persistent storage. A program stored on the storage medium 330 may include one or more modules (not shown), each of which may include a series of instruction operations on a data processing apparatus. Still further, the central processing unit 322 may be configured to communicate with the storage medium 330 to execute a series of instruction operations on the storage medium 330 on the computer device 301.

The computer device 301 may further include one or more power supplies 326, one or more wired or wireless network interfaces 350, one or more input and output interfaces 358, and/or one or more operating systems 341, such as Windows Server™, Mac OS X™, Unix™, Linux™, FreeBSD™, etc.

The steps in the method for searching for free blocks in the bitmap data described above with reference to FIG. 1 may be implemented by the architecture of the computer device described by the embodiment.

An embodiment discloses a readable storage medium, on which a program is stored, and when the program is executed by a processor, the steps of the method for searching for free blocks in the bitmap data as described in the above-mentioned embodiment are implemented, and reference can be made to the description of the method for searching for free blocks in the bitmap data in the above-mentioned embodiment.

The readable storage medium can be specifically a U-disk, a removable hard disk, a Read-Only Memory (ROM), a Random Access Memory (RAM), a magnetic disk or an optical disk that can store program codes.

Various embodiments described in the description are described in a progressive manner, each embodiment focuses on the difference from other embodiments, and the same or similar parts of each embodiment can be referred to each other. The apparatus disclosed in the embodiment corresponds to the method disclosed in the embodiment, thus the description is relatively simple, and for the related information, please refer to the description of the method.

Those skilled in the art can further realize that the exemplary units and algorithm steps described in conjunction with the embodiments disclosed herein can be implemented by electronic hardware, computer software, or a combination of the two. In order to clearly illustrate the interchangeability between hardware and software, the composition and steps of each example have been generally described according to their functions in the above description. Whether these functions are executed by hardware or software depends on the specific application and design constraints of the technical solution. Those skilled in the art may use different methods to implement the described functions for each specific application, but such implementation should not be regarded as exceeding the scope of the present disclosure.

The steps of the method and algorithm described in conjunction with the embodiments disclosed herein can be implemented by be implemented directly by hardware, soft-ware modules executed by processors, or a combination of the two. The software modules may be placed in a random access memory (RAM), a memory, a read-only memory (ROM), an electrically programmable ROM, an electrically erasable programmable ROM, registers, hard disks, removable disks, CD-ROMs, or any other form of storage media known in the related art.

The method, apparatus, device for searching for free blocks in the bitmap data and a readable storage media provided by the application are described above in details. Herein, specific examples are used to explain the principle and implementation of the present application. The above examples are only used to help understand the method of the present application and its core ideas. It should be pointed out that for those skilled in the art, without departing from the principle of the present disclosure, some improvements and modifications can also be made to the application, and these improvements and modifications also fall within the protection scope of the claims of the application.

The invention claimed is:

1. A method for searching for free blocks in bitmap data, comprising:
   determining a bitmap data block that is to be searched for free blocks;
   dividing the bitmap data block into a plurality of integer data with a fixed length;
   obtaining data arrangement characteristic information corresponding to integer data by performing, with a value of the integer data being used as an index, an array value solving operation on a template array; wherein values of all integer data with the fixed length are used as array indexes of the template array, and corresponding data arrangement characteristic information is used as data items of the template array; the data arrangement characteristic information comprises distribution information and a number of free blocks; and
   obtaining a statistic of an overall distribution of free blocks in the bitmap data block according to data arrangement characteristic information corresponding to each of the integer data.

2. The method according to claim 1, wherein the data arrangement characteristic information comprises a data level and the number of free blocks, the data level indicates a data block release priority generated according to the distribution of free blocks, and is used as the distribution information;
   after obtaining the statistic of the overall distribution of free blocks in the bitmap data block according to data arrangement characteristic information corresponding to each of the integer data, the method further comprises: releasing the bitmap data block according to the overall distribution of free blocks.

3. The method according to claim 2, wherein dividing the bitmap data block into a plurality of integer data with a fixed length comprises:
   dividing the bitmap data block every 16 bits to obtain a plurality of 16-bit integer data.

4. The method according to claim 3, wherein the data level and a corresponding determination rule comprise:
   Level 1, more than 15 bits being 0;
   Level 2, 8 or more successive bits being 0, and the successive bits of 0 being located on both sides;
   Level 3, 8 or more successive bits being 0, and the successive bits of 0 being located in the middle;
   Level 4, 4~7 successive bits being 0, and the successive bits of 0 being located on both sides;

Level 5, 4~7 successive bits being 0, and the successive bits of 0 being located in the middle;
Level 6, less than 4 successive bits being 0, and a total number of bits of 0 being not less than 10;
Level 7, less than 4 successive bits being 0, and the total number of bits of 0 being not less than 6;
Level 8, no successive bits being 0, and the total number of bits of 0 being not less than 6;
Level 9, no successive bits being 0, and the total number of bits of 0 being less than 6;
Level 10, 16 bits all being 1;
wherein 0 is a free block, 1 is a non-free block, and a data block release priority decreases from Level 1 to Level 10.

5. The method according to claim 4, wherein releasing the bitmap data block according to the overall distribution of free blocks comprises:
for integer data belonging to Level 1, Level 2 and Level 3, selecting more than 8 successive bits of 0 for bit release;
for integer data belonging to Level 4 and Level 5, selecting more than 4 successive bits of 0 for bit release; and
for integer data belonging to Level 6, Level 7, Level 8, Level 9 and Level 10, searching for bits of 0 for bit release.

6. The method according to claim 3, wherein the data arrangement characteristic information is 8-bit integer data, the first 4 bits of the 8-bit integer data indicate the data level, and the last 4 bits of the 8-bit integer data indicate the number of 0 in the 16-bit integer data.

7. The method according to claim 2, after dividing the bitmap data block into a plurality of integer data with a fixed length, the method further comprises:
selecting a designated number of data as sample data by sampling the integer data randomly.

8. The method according to claim 7, wherein the obtaining data arrangement characteristic information corresponding to integer data by performing, with a value of the integer data being used as an index, an array value solving operation on a template array comprises: obtaining data arrangement characteristic information corresponding to the sample data by performing, with the value of the sample data being used as the index, an array value solving operation on the template array.

9. The method according to claim 7, wherein the obtaining a statistic of an overall distribution of free blocks in the bitmap data block according to data arrangement characteristic information corresponding to each of the integer data comprises: obtaining the statistic of the overall distribution of free blocks in the bitmap data block according to data arrangement characteristic information corresponding to each of the sample data.

10. The method according to claim 2, wherein the obtaining data arrangement characteristic information corresponding to integer data comprises:
performing a weighted calculation, with a data block release priority corresponding to the data level being used as a weight, on the number of sample data corresponding to each data level, and using the obtained weighted value as the overall distribution of free blocks in the bitmap data block.

11. The method according to claim 10, wherein after obtaining statistics of the overall distribution of free blocks in the bitmap data block according to the data arrangement characteristic information corresponding to each integer data, the method further comprises:

calculating a ratio of a weighted value corresponding to each bitmap data block to the total number of free blocks in the bitmap data block;
releasing each bitmap data block in a descending order of the ratio.

12. The method according to claim 11, wherein the determining a bitmap data block that is to be searched for free blocks comprises selecting the bitmap data block in the descending order of the ratio.

13. The method according to claim 1, wherein the bitmap data block is one of a data volume bitmap block and a metadata volume bitmap block.

14. The method according to claim 1, wherein the obtaining a statistic of an overall distribution of free blocks in the bitmap data block comprises:
determining an adjacent integer data according to a dividing position of each integer data to determine the distribution of free blocks in the whole bitmap data block.

15. The method according to claim 1, further comprising modifying the data block, wherein a minimum modification unit is bit, an allocation of block corresponds to modifying a bit from 0 to 1, and a recovery of block corresponds to modifying a bit from 1 to 0.

16. A computer device, comprising:
a memory for storing a computer program; and
a processor for executing the computer program to implement the method for searching for free blocks in bitmap data according to claim 1.

17. The computer device according to claim 16, wherein the data arrangement characteristic information comprises a data level and the number of free blocks, the data level indicates a data block release priority generated according to the distribution of free blocks, and is used as the distribution information;
after obtaining the statistic of the overall distribution of free blocks in the bitmap data block according to data arrangement characteristic information corresponding to each of the integer data, the processor is further configured to implement steps of releasing the bitmap data block according to the overall distribution of free blocks.

18. The computer device according to claim 17, wherein the processor is further configured to implement steps of:
dividing the bitmap data block every 16 bits to obtain a plurality of 16-bit integer data.

19. The computer device according to claim 18, wherein the data level and a corresponding determination rule comprise:
Level 1, more than 15 bits being 0;
Level 2, 8 or more successive bits being 0, and the successive bits of 0 being located on both sides;
Level 3, 8 or more successive bits being 0, and the successive bits of 0 being located in the middle;
Level 4, 4~7 successive bits being 0, and the successive bits of 0 being located on both sides;
Level 5, 4~7 successive bits being 0, and the successive bits of 0 being located in the middle;
Level 6, less than 4 successive bits being 0, and a total number of bits of 0 being not less than 10;
Level 7, less than 4 successive bits being 0, and the total number of bits of 0 being not less than 6;
Level 8, no successive bits being 0, and the total number of bits of 0 being not less than 6;
Level 9, no successive bits being 0, and the total number of bits of 0 being less than 6;
Level 10, 16 bits all being 1;

wherein 0 is a free block, 1 is a non-free block, and a data block release priority decreases from Level 1 to Level 10.

20. A non-transitory readable storage medium, wherein the readable storage medium has stored thereon a program that, when executed by a processor, implements the method for searching for free blocks in bitmap data according to claim 1.

* * * * *